(12) United States Patent
Harber

(10) Patent No.: US 10,618,687 B2
(45) Date of Patent: Apr. 14, 2020

(54) SHOCK AND VIBRATION ABSORBING PALLETS AND PANELS

(71) Applicant: Paul J. Harber, Indianapolis, IN (US)

(72) Inventor: Paul J. Harber, Indianapolis, IN (US)

(\*) Notice: Subject to any disclaimer, the term of this patent is extended or adjusted under 35 U.S.C. 154(b) by 0 days.

(21) Appl. No.: 15/924,514

(22) Filed: Mar. 19, 2018

(65) Prior Publication Data

US 2018/0282019 A1 Oct. 4, 2018

Related U.S. Application Data

(60) Provisional application No. 62/477,756, filed on Mar. 28, 2017.

(51) Int. Cl.
*B65D 19/38* (2006.01)
*B32B 3/20* (2006.01)
(Continued)

(52) U.S. Cl.
CPC ............ *B65D 19/38* (2013.01); *B32B 3/20* (2013.01); *B32B 27/08* (2013.01); *B32B 27/32* (2013.01); *B32B 27/40* (2013.01); *B65D 19/0055* (2013.01); *B65D 19/0063* (2013.01); *B65D 81/02* (2013.01); *B32B 2250/03* (2013.01); *B32B 2250/40* (2013.01); *B32B 2307/56* (2013.01); *B32B 2307/7265* (2013.01); *B32B 2553/02* (2013.01); *B65D 2519/00034* (2013.01); *B65D 2519/00069* (2013.01); *B65D 2519/00273* (2013.01);
(Continued)

(58) Field of Classification Search
CPC ............ B65D 19/38; B65D 19/0063; B65D 2519/00034; B65D 2519/00069; B65D 2519/00273; B65D 2519/00293; B65D 2519/00318; B65D 2519/00562; B65D 81/02; B65B 3/20; B32B 27/08; B32B 27/32; B32B 27/40; B32B 2250/40; B32B 2250/03; B32B 2307/56; B32B 2307/7265; B32B 2553/02; B32B 3/20; F16F 1/36; F16F 1/3732; F16F 2224/025
USPC .... 108/51.12, 57.12, 51.3, 55.1–55.5, 57.13, 108/57.16, 57.31, 57.33
See application file for complete search history.

(56) References Cited

U.S. PATENT DOCUMENTS 1,296,359 A \* 3/1919 Brown ...................... A63D 5/00
473/64
2,477,852 A \* 8/1949 Bacon ....................... E04C 2/36
156/189

(Continued)

*Primary Examiner* — Daniel J Troy
*Assistant Examiner* — Timothy M Ayres
(74) *Attorney, Agent, or Firm* — Maginot, Moore & Beck, LLP

(57) ABSTRACT

A shock and vibration isolation assembly for absorbing the energies generated from movement of a product carried thereon includes a pallet or a lower panel having an upper surface, an upper panel above the upper surface, the upper panel configured to support the product or a pallet thereon. The assembly further includes a plurality of flexible viscoelastic rings affixed to at least one of said upper surface of said pallet or lower panel and a facing surface of the upper panel. A frame member disposed between and affixed to the upper surface of the pallet or lower panel and the upper panel to seal the space therebetween. The frame member encircles the plurality of flexible rings and is formed of a resilient substantially liquid-impermeable material.

11 Claims, 2 Drawing Sheets

(51) Int. Cl.
    *B32B 27/08* (2006.01)
    *B32B 27/32* (2006.01)
    *B32B 27/40* (2006.01)
    *B65D 19/00* (2006.01)
    *B65D 81/02* (2006.01)
    *F16F 1/373* (2006.01)
    *F16F 1/36* (2006.01)
    *F16F 1/44* (2006.01)
    *F16F 15/08* (2006.01)

(52) U.S. Cl.
    CPC ........... *B65D 2519/00293* (2013.01); *B65D 2519/00318* (2013.01); *B65D 2519/00333* (2013.01); *B65D 2519/00562* (2013.01); *F16F 1/36* (2013.01); *F16F 1/3732* (2013.01); *F16F 1/44* (2013.01); *F16F 15/08* (2013.01); *F16F 2224/025* (2013.01)

(56) References Cited

U.S. PATENT DOCUMENTS

| | | | | |
|---|---|---|---|---|
| 2,798,685 A * | 7/1957 | Mooney | ............ | B65D 19/0028 108/51.3 |
| 3,351,027 A * | 11/1967 | Ellard, Jr. | .......... | B65D 19/0028 108/57.12 |
| 4,194,255 A * | 3/1980 | Poppe | ................ | A47C 27/065 267/153 |
| 4,877,136 A * | 10/1989 | Mizuno | ................ | B65D 81/07 206/521 |
| 6,418,862 B1 * | 7/2002 | Heil | ................... | B65D 19/0028 108/57.12 |
| 8,146,516 B2 * | 4/2012 | Linares | ................... | B32B 3/12 108/51.3 |
| 8,720,350 B2 * | 5/2014 | Bush | ................ | B65D 19/0073 108/57.12 |
| 9,227,757 B1 * | 1/2016 | Green | ................ | B65D 19/0095 |
| 9,284,107 B2 * | 3/2016 | Schultz | ................ | F16F 15/067 |
| 9,291,234 B1 * | 3/2016 | Green | ................... | B65D 19/40 |
| 9,834,334 B2 * | 12/2017 | Yoshifusa | .......... | B65D 19/0069 |
| 10,040,599 B1 * | 8/2018 | El Kawam | ........ | B65D 19/0018 |
| 10,059,487 B2 * | 8/2018 | Sun | ........................ | B65D 81/02 |
| 2006/0130712 A1 * | 6/2006 | Wang | ................ | B65D 19/0075 108/57.25 |
| 2006/0288913 A1 * | 12/2006 | Lo | ...................... | B65D 19/0038 108/51.3 |
| 2007/0221102 A1 * | 9/2007 | Reinhall | ............ | B65D 19/0073 108/57.12 |
| 2008/0196633 A1 * | 8/2008 | Ho | ..................... | B65D 19/0075 108/51.3 |
| 2008/0250987 A1 * | 10/2008 | Hartel | ................ | B65D 19/0048 108/57.12 |
| 2010/0229308 A1 * | 9/2010 | Pearce | ................ | A47C 27/144 5/655.5 |
| 2011/0192326 A1 * | 8/2011 | Ingham | ............ | B65D 19/0048 108/57.17 |
| 2013/0186309 A1 * | 7/2013 | Niu | .................... | B65D 19/0012 108/51.3 |
| 2013/0233760 A1 * | 9/2013 | Polando | ................ | B65D 81/02 206/591 |

\* cited by examiner

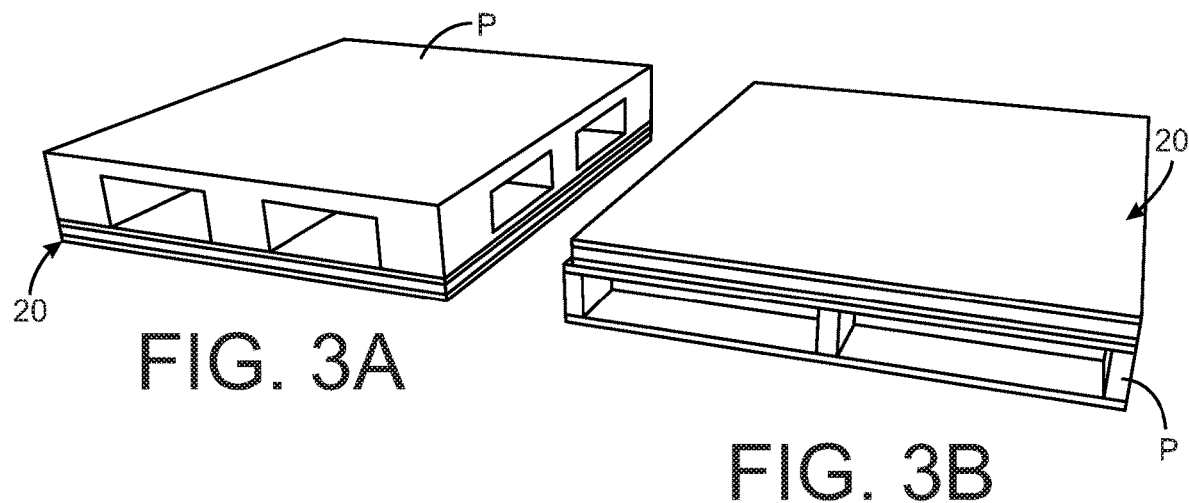
FIG. 3A
FIG. 3B
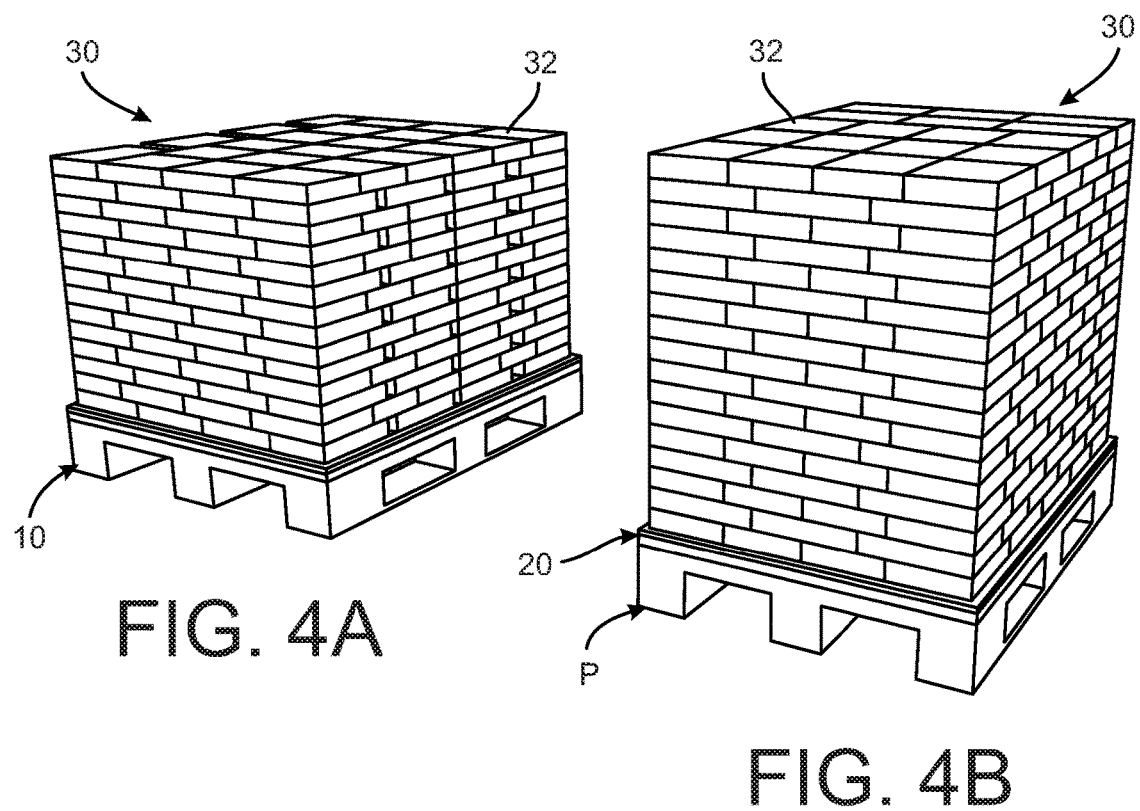
FIG. 4A
FIG. 4B

SHOCK AND VIBRATION ABSORBING PALLETS AND PANELS

REFERENCE TO RELATED APPLICATION

This application is a utility filing from and claims priority to U.S. Provisional Application No. 62/477,756, entitled "Vibration Absorbing Pallet for Pharmaceutical Glass Containers", filed on Mar. 28, 2017, the entire disclosure of which is incorporated herein by reference.

FIELD OF INVENTION

This present invention relates to shock and vibration absorbing materials s that isolate a product from the damaging effects of shock and vibration inherent during movement within or between sites of manufacture or distribution. In particular, the invention relates to a panel assembly that may be placed atop or under a pallet, depending on the loading preference of the user.

BACKGROUND

This disclosure relates to devices to reduce vibration and shock energies that occur during transportation of empty glass containers, glass or plastic containers filled with sensitive drug product or drug substance, medical device components, computers and computer components, automobile parts, which may be damaged by elevated levels of either shock or vibration when transported between or within manufacturing sites or within a plant, to the next point of use.

Pallets are frequently used to ship empty glass containers, glass or plastic containers filled with sensitive drug product or drug substance, medical device components, computers, computer components, automobile parts (hereafter referred to as "the product") between or within manufacturing sites or to the next point of use. At the manufacturer's site, the product may be placed in cartons. Boxes or some subassemblies may be directly secured to the pallet. The palletized product is loaded onto trucks, or intermodal containers, or in-plant carts for transfer to the next station for further processing or distribution and sale via air, road, or ocean.

For the shock and vibration sensitive product, the transport damage incurred, whether detected or not, continues to have an impact throughout all subsequent process steps and result in loses at each step. Gross breakage is readily identified upon receipt of the product but unidentified flaws present product quality issues that may not be identified until failure in-use. When there is product-to-product contact or container to product contact, the shock and vibration causes surface scratching and creates the necessary surface flaws that will result in damages that occur at any time during further processing or during use of the product.

In some applications, the pallet is unwrapped and sanitized prior to being moved into a clean room. From there, the product may be washed or sterilized. Since the product may be shipped to other sites within the supply chain for additional processing, product must again be transported by road, air or sea. In addition, vibration energies have a significant impact on materials that may be contained within the product container. Moreover, in the case of medicines, the breakage of a filled glass container means more than just the loss of a container—it means the loss of a potentially life-saving pharmaceutical product.

Unlike shock events that may be unpredictable and are usually isolated to the mishandling of one or more pallets, vibration is a constant transport hazard that is present on all pallets every time the pallets are placed in transit. There is an unmet need to reduce product breakage and flaws incurred during transportation.

SUMMARY OF THE INVENTION

The invention satisfies the unmet need by providing a surface that effectively isolates the product from shock and vibration energies generated during transportation. The invention is comprised of rigid, cleanable panels with an inner core of Sorbothane®, configured and arranged to absorb shock and vibration energies. The invention may be integral with a suitable pallet, in which the Sorbothane® is bonded directly to the pallet and the rigid panel is placed atop and bonded to the Sorbothane®). Alternatively, two rigid panels may enclose the Sorbothane® core material to form an independent unit. The Sorbothane® core material is in direct contact with both rigid surfaces and comprises the only contact between the rigid panels, be that the pallet or a second panel. This feature assures that no shock or vibrational energy is transferred between panels or from panel to pallet through fastening bolts or other rigid means of making an integral unit.

A lower pallet is provided that is configured for forklift transport in accordance with typical logistics protocols. The product is placed on an upper panel of the pallet assembly. The pallet assembly includes vibration-absorbing components that are the only components in contact with a lower pallet and the upper panel, thereby assuring isolation of the payload from the lower pallet. The vibration absorbing components include vibration cushions that are permanently adhered to the upper surface of the pallet or adhered to a second panel that forms a unit that may be placed on any pallet. The construction creates an integral assembly that can be sanitized for introduction to clean room environments and washed for re-use.

DESCRIPTION OF DRAWINGS

FIG. 3 is a perspective view of the independent panels assembly placed over and under the pallet, such as on the floor of a truck, cart, airplane, or intermodal container according to a third embodiment of the present invention.

FIG. 4 is a perspective view of product stacked on pallets prior to being wrapped for shipment.

DETAILED DESCRIPTION

Figure 1:
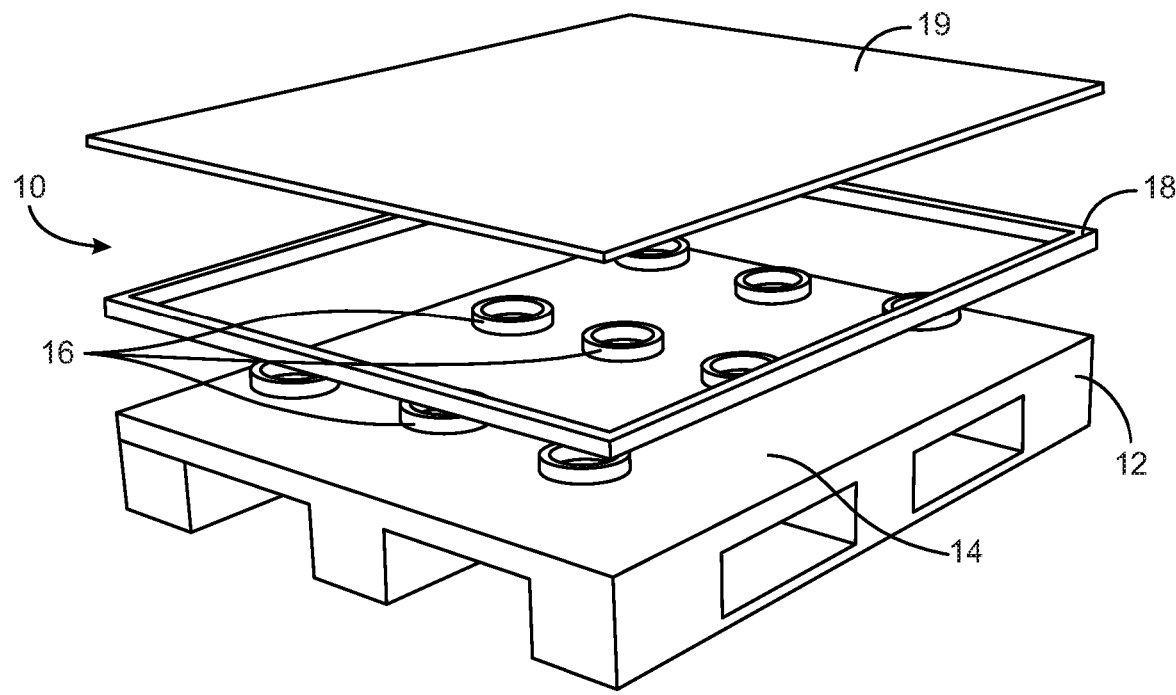
FIG. 1 is an exploded perspective view of the components of an integral pallet assembly according to one embodiment of the present invention.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A pallet assembly 10 according to the present disclosure is shown in FIG. 1. The pallet assembly 10 includes a base pallet 12 that can be of any known configuration used for shipping stacked product. In one embodiment the base pallet can be a conventional 4-way pallet that is molded from high-density polyethylene (HDPE) with a 3×3 leg support system. The base pallet 12 can be a typical rectangular 40"×48" pallet as used in North American markets or a 31.5"×47.24" pallet as used in the European markets. The height of the pallet can be the typical 4.5" height.

In one aspect of the present disclosure, a plurality of vibration isolation rings 16 is affixed to the upper surface 14 of the base pallet 12. In one embodiment, the rings are circular rings molded from Sorbothane® visco-elastic polymer, produced by Sorbothane, Inc. of Kent, Ohio. The Sorbothane® can have a Shore 20-40 A durometer. The rings 16 are permanently chemically bonded to the upper surface 14 by a suitable adhesive, such as a cyanoacrylate polyurethane or neoprene-based adhesive. The rings 16 have an outer diameter of 5-6", an inner diameter of 3-4", a wall width of 1-2" and a thickness of about 1.5". The pallet assembly 10 can include 9-16 rings 16 evenly distributed across the width and length of the base pallet 12. The rings 16 are preferably circular so that the vibration isolation rings can absorb lateral vibration energy or vibration transverse to a vertical axis through the base pallet.

An upper panel 19 can be permanently bonded to the plurality of rings 16, preferably by the same adhesive used to bond the rings to the pallet surface. The panel is substantially rigid to resist deformation when a load is positioned on the panel. In one embodiment, the upper panel can be a sheet of HDPE with a thickness of 0.25-0.75". The upper panel 19 has an area and configuration that is substantially co-extensive with the area and configuration of the base pallet 12. Thus, for the standard North American pallet described above, the upper panel can be rectangular with a dimension of 40"×48".

The space between the upper panel 19 and the upper surface 14 of the base pallet 12 is sealed with a frame member 18 extending around the entire perimeter of the upper panel and upper surface. The frame member is thus substantially co-extensive with the perimeter portion of the pallet. Again, for a standard North American pallet, the frame member 19 can have an outer dimension of 40"×48". The frame forms a hollow interior to receive the plurality of rings 16. Thus, in one embodiment, the frame member can have a wall thickness of 1-2".

The frame member 18 is formed of a compressible material, which can have a durometer equal to or less than the rings 16. In one embodiment the frame member can be formed of the same material as the rings, such as Sorbothane®. In a preferred embodiment, the frame member is formed of a material having a durometer less than the rings, such as Shore 10-20 A. In this embodiment, the frame member 18 has the dual role of participating in the vibration damping function of pallet assembly as well as sealing the space occupied by the vibration rings 16. Thus, the frame member is formed of a material that is substantially impermeable to liquids. The frame member 18 is bonded to both the upper panel 19 and the upper surface 14 of the base pallet. In one embodiment, the frame member 18 has a thickness equal to the thickness of the vibration isolation rings 16, such as 1.5" in the embodiment of the rings described above. In another embodiment, the frame member 18 has a thickness greater than the thickness of the rings, such as 2.0" for the embodiment of the rings described above. In this embodiment, the isolation rings bonded to the surface 14 of the pallet 12 are initially offset from the upper panel 19 due to the thickness of the frame member 18. When a load is supported on the upper panel 19, the frame member 18 is compressed until the upper panel contacts and slightly compresses the rings 16. It can be appreciated that the plurality of rings 16 may alternatively be bonded to the underside of the upper panel 19.

Figure 2:
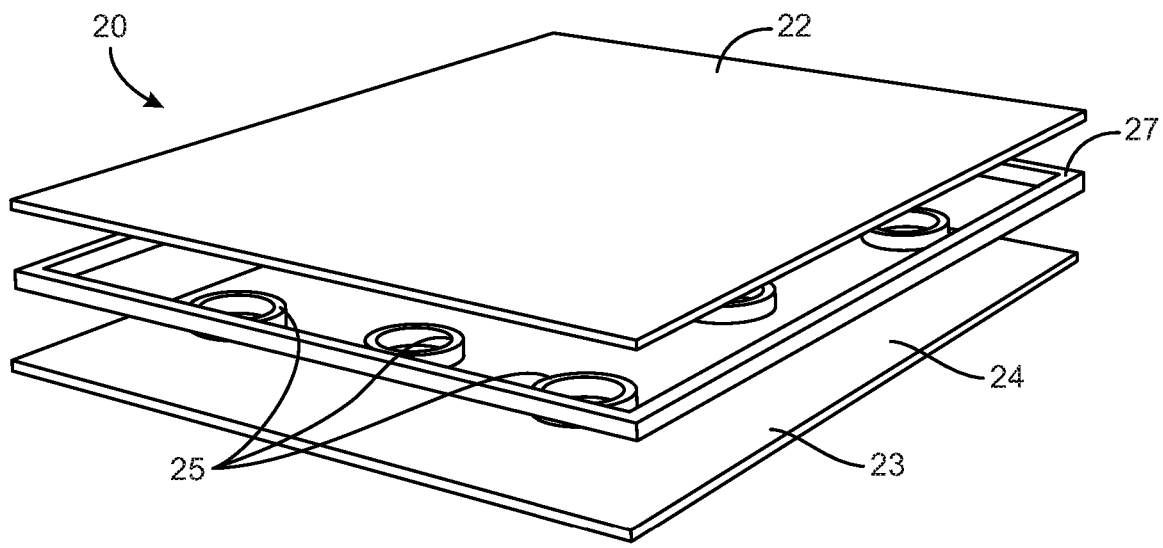
FIG. 2 is an exploded perspective view of the components of an independent panel assembly according to a second embodiment of the present invention.

In an alternative embodiment shown in FIG. 2, an independent panel assembly 20 may be provided that includes two panels, namely an upper panel 22 and a lower panel 23. The panels 22, 23 are preferably identical in configuration and size. The panels may be the same as the panel 19, namely formed of HDPE with a thickness of 0.25-0.75". The independent panel assembly 20 includes a plurality of vibration isolation rings 25 affixed to the upper surface 24 of the lower panel 23. The rings 25 are identical to the rings 16 described above, namely formed of Sorbothane® visco-elastic polymer with a Shore 20-40 A durometer, and can be bonded to the lower panel using the same adhesive.

The independent panel assembly 20 further includes a frame member 27 that is identical to the frame member 18. As discussed above, the frame member 27 is formed of a compressible and liquid-impermeable material, which can have a durometer equal to or less than the rings 25, such as Shore 10-20 A. The frame member 27 is substantially co-extensive with the perimeter portion of the two panels 22, 23. Like the frame member 18, the frame member 27 has the dual role of participating in the vibration damping function of pallet assembly as well as sealing the space occupied by the vibration rings 25. The frame member 27 can thus be bonded to both the upper panel 22 and the upper surface 24 of the lower panel 23. As discussed above, the frame member 27 can have a thickness equal to the thickness of the vibration isolation rings 25 or a thickness greater than the thickness of the rings. In the latter case, the isolation rings bonded to the lower panel 23 are offset from the upper panel 22 due to the thickness of the frame member. When a load is supported on the upper panel 22, the frame member 27 is compressed until the upper panel 22 contacts and slightly compresses the rings 25.

As shown in FIG. 3(a) the independent panel assembly 20 can be placed on the floor of a vehicle with the conventional pallet P placed atop the assembly. Alternatively, as shown in FIG. 3(b), the independent panel assembly 20 can be placed atop the conventional pallet P. The independent panel is suitable for use with either a plastic pallet or a lower cost wooden pallet. Since the independent panel 20 is not fixed to the conventional pallet, it can be re-used many times with different pallets and in different configurations.

When pharmaceutical glass containers are shipped as a palletized load 30, they are typically placed in enclosed trays, such as the trays 32 shown in FIGS. 4(a), (b). The trays typically carry 100-300 glass containers, in direct contact with each other. The pallet load 30 typically includes 14-20 layers of trays, with 16-20 trays in each layer, so that a single pallet assembly 10 (FIG. 4(a)) or independent panel assembly 20 (FIG. 4(b)) may carry over 100,000 glass containers. Most of each glass container is exposed above the base of the tray so that the containers can rattle against each other when subjected to vibration during transport. Even if the vibration does not cause a glass container to break, the rattling can cause scratches in the glass containers that render the containers more susceptible to breakage during subsequent operations, such as washing, filling and further packaging, or even during subsequent use. It has been found that in any shipment of glass containers—whether empty or filled with a pharmaceutical—up to 500 ppm of the containers are compromised during shipment. For pharmaceutical products, even a loss rate as low as 200 ppm is unacceptable. With annual production of 200 million a 500 ppm loss rate could result in annual losses in excess of $2 M per year.

With the present invention, the trays 32 can be stacked in a conventional manner on the pallet assembly 10 or panel assembly 20. One or more layers of plastic wrap are secured over the palletized load and the load is further unitized by the use of banding straps. The loaded pallet is then ready for transport.

The pallet assembly 10 and panel assembly 20 disclosed herein are capable of withstanding the level of sanitization required for use in clean room environments. The frames 18, 27 seal the respective vibration isolation rings 16, 25 so that the rings are not exposed to sterilization chemicals that might compromise the physical properties of the rings. The pallet assembly 10 and panel assembly 20 can thus be washed and sterilized as frequently as necessary.

The present disclosure should be considered as illustrative and not restrictive in character. It is understood that only certain embodiments have been presented and that all changes, modifications and further applications that come within the spirit of the disclosure are desired to be protected.

What is claimed is:

1. A shock and vibration isolation pallet assembly, for absorbing the energies generated from movement of a product carried thereon, comprising:
    a pallet having an upper surface;
    an upper panel above said upper surface, the upper panel configured to support the product thereon, wherein the upper panel and said pallet have a configuration and area that are substantially co-extensive;
    a plurality of flexible rings affixed to at least one of said upper surface of said pallet and a surface of said upper panel facing said upper surface, said flexible rings formed of a visco-elastic material; and
    a frame member disposed between and affixed to the upper surface of said pallet and said upper panel to seal the space therebetween, said frame member configured to encircle the plurality of flexible rings and formed of a resilient substantially liquid-impermeable material, wherein said plurality of rings are chemically bonded to at least one of said upper surface of said pallet and said surface of said upper panel facing said upper surface.

2. The pallet assembly of claim 1, wherein each of said plurality of flexible rings is formed of a material having a durometer greater than or equal to the resilient material of said frame member.

3. The pallet assembly of claim 2, wherein the material of said plurality of flexible rings has a durometer of Shore 20-40 A.

4. The pallet assembly of claim 3, wherein the resilient material of said frame member has a durometer of Shore 10-20 A.

5. The pallet assembly of claim 1, wherein said frame member has a configuration that is substantially co-extensive with a perimeter portion of the pallet.

6. The pallet assembly of claim 1, wherein said frame member is chemically bonded to both said upper surface of said pallet and said upper panel.

7. The pallet assembly of claim 1, wherein said upper panel is formed of a substantially rigid material relative to said plurality of flexible rings.

8. The pallet assembly of claim 7, wherein said upper panel is formed of a high-density polyethylene (HDPE).

9. The pallet assembly of claim 1, wherein said plurality of flexible rings are circular and have an outer diameter of 5-6", an inner diameter of 3-4", a wall width of 1-2" and a thickness of about 1.5".

10. The pallet assembly of claim 1, wherein the plurality of flexible rings includes 9-16 rings evenly distributed across the width and length of said pallet.

11. The pallet assembly of claim 1, wherein said frame member has a thickness between said upper panel and said pallet that is greater than the thickness of each of said plurality of rings between said upper panel and said pallet.

\* \* \* \* \*